(12) United States Patent
Cook

(10) Patent No.: US 6,234,860 B1
(45) Date of Patent: May 22, 2001

(54) GAME CALL WITH FINE, PRECISE ADJUSTABLE TONE

(75) Inventor: Gregory A. Cook, Garrettsville, OH (US)

(73) Assignee: Flambeau Products Corporation, Middlefield, OH (US)

( * ) Notice: Subject to any disclaimer, the term of this patent is extended or adjusted under 35 U.S.C. 154(b) by 0 days.

(21) Appl. No.: 09/505,037

(22) Filed: Feb. 16, 2000

(51) Int. Cl.[7] ................................................ A63H 5/00
(52) U.S. Cl. ................................................ 446/208; 446/207
(58) Field of Search ............................ 446/207, 208, 446/397, 202, 203, 206, 204; 84/380 R, 382, 383 R, 383 A, 384, 402

(56) References Cited

U.S. PATENT DOCUMENTS

| | | | |
|---|---|---|---|
| 1,506,364 | * 8/1924 | Chiron et al. | .................. 84/383 R |
| 2,745,214 | * 5/1956 | Lawson | .................. 446/207 |
| 3,656,258 | * 4/1972 | Thomas | .................. 446/208 |
| 4,041,827 | * 8/1977 | Daglis | .................. 84/383 R |
| 4,838,445 | 6/1989 | Lanius . | |
| 5,910,039 | * 6/1999 | Primos et al. | .................. 446/207 |

* cited by examiner

Primary Examiner—Jacob K. Ackun, Jr.
Assistant Examiner—U. Cegielnik
(74) Attorney, Agent, or Firm—Michael Best & Friedrich LLP

(57) ABSTRACT

A game call includes a hollow tubular body having an opening, and a subassembly comprising a wedge, reed, and tone board inserted at least partially into the opening. The tone board and wedge include complementary projections that resist relative axial movement between the wedge and the tone board to permit systematic incremental tuning of the game call.

3 Claims, 1 Drawing Sheet

GAME CALL WITH FINE, PRECISE ADJUSTABLE TONE

FIELD OF THE INVENTION

The invention relates to game calls, and more specifically to game calls having adjustable tone capabilities.

BACKGROUND

It is known to provide a game call having a reed clamped between a wedge and a tone board in a hollow tubular body. The wedge and tone board typically have smooth interfacing surfaces to permit the wedge to slide with respect to the tone board. It is known to move the reed and/or wedge with respect to the tone board to tune the game call to a desired frequency.

Game calls are often used by hunters in cool temperature weather conditions. A hunter attempting to adjust the frequency of the game call may have a difficult time holding the wedge, tone board, and reed together while inserting the three-piece assembly into the hollow tubular body due to the effects of such cool temperature conditions on the hunter's fingers. Because the wedge and tone board easily slide with respect to each other, systematic tuning of the game call is made difficult or impossible.

SUMMARY

The present invention provides a game call including a body having a tubular portion and an opening, an elongated tone board at least partially received within the opening, a reed supported by the tone board, and a wedge securing the reed to the tone board and at least partially received within the opening. The wedge and tone board each include a plurality of projections separated by recesses. The wedge projections are inserted into a selected series of tone board recesses to resist relative axial movement between the wedge and the tone board.

Preferably, the game call is tuned by the manufacturer, and provided with a reference indicator showing the relative positions of the wedge and tone board for the pre-tuned assembly. The game call may be tuned by the operator by removing the wedge, tone board, and reed from the opening, and by then adjusting the positions of the wedge and the tone board with respect to each other without moving the reed with respect to the tone board. This is accomplished by holding the reed with respect to the tone board, positioning the wedge projections into a different series of tone board recesses, holding the wedge, reed, and tone board assembly together, and inserting the assembly into the opening. The engagement of the wedge and tone board projections resists relative movement between the wedge and the tone board as the assembly is inserted into the opening.

One feature and advantage of the present invention is to provide a game call having a wedge and tone board that include interengaging projections to resist relative axial movement between the wedge and tone board.

Another feature and advantage of the present invention is to provide a game call permitting systematic and incremental tuning.

Another feature and advantage of the present invention is to provide a game call that may be relatively easily tuned in cold weather.

Another feature and advantage of the present invention is to provide a reference indicator to permit the game call to be tuned to the manufacturer's suggested setting easily, and to provide a reference point for subsequent retuning.

Other features and advantages of the invention will become apparent to those skilled in the art upon review of the following detailed description, claims, and drawings.

Figure 1:
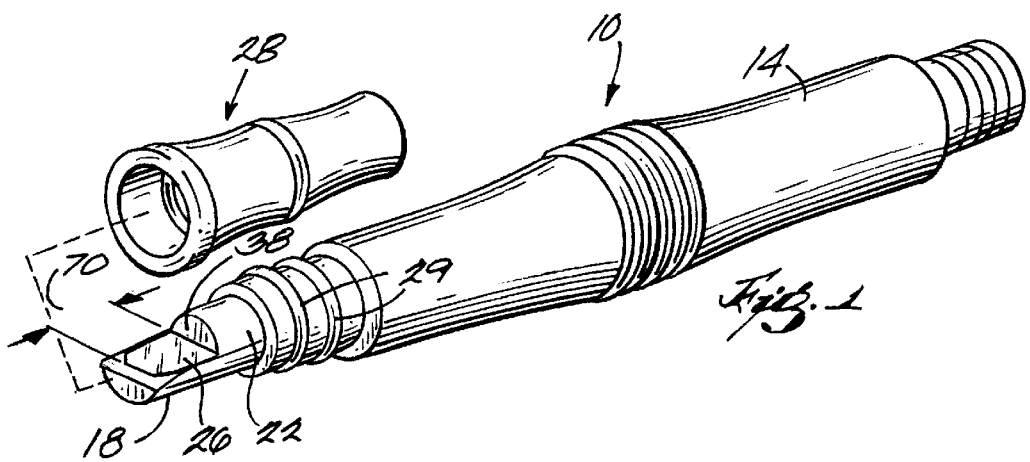
FIG. 1 is a perspective view of a game call embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 illustrates a game call 10 having a hollow tubular body 14 and a subassembly comprising a tone board 18, a wedge 22, and a reed 26 disposed between the tone board 18 and the wedge 22. A mouth piece 28 may be provided and fit over the subassembly to facilitate operating the game call. A pair of o-rings 29 are provided to ensure a tight slip fit between the mouth piece 28 and the hollow tubular body 14.

The illustrated game call 10 is a goose call having a single reed 26. The invention may alternatively be embodied in other game calls, such as deer calls and mallard calls, and may employ two or more reeds 26 to obtain a desired sound. The term "subassembly," as used herein, includes the illustrated three-piece subassembly as well as subassemblies having multiple reeds 26.

Figure 2:
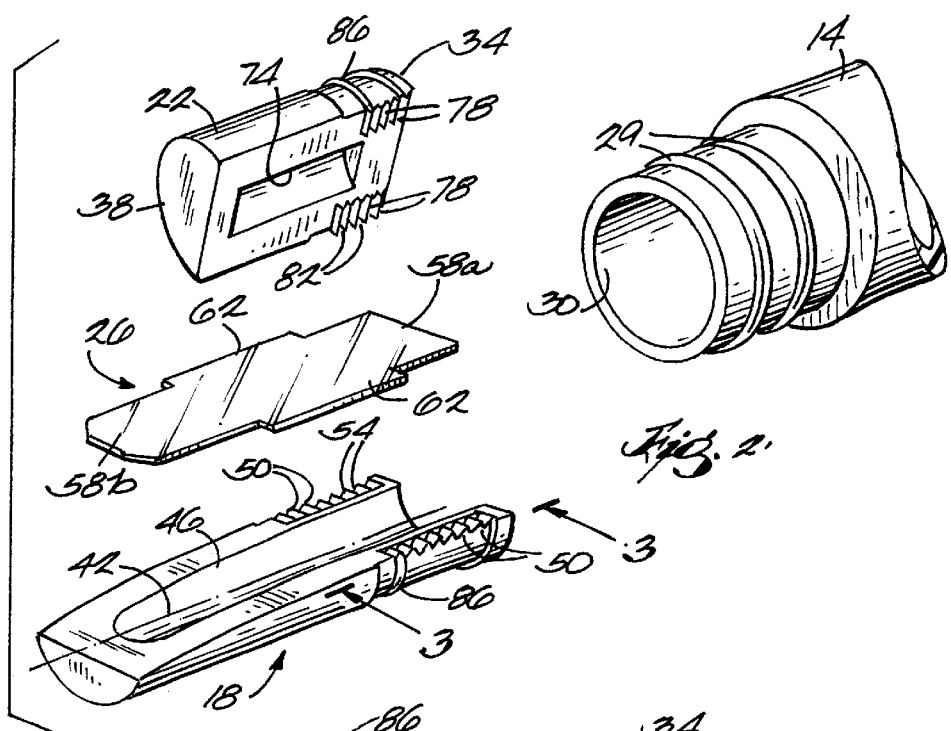
FIG. 2 is an enlarged exploded view of the game call of FIG. 1.

As best seen in FIG. 2, the subassembly is insertable into an open end or opening 30 of a cylindrical bore in the hollow tubular body 14. The wedge 22 is tapered to create a pressure-fit between the subassembly and the tubular body 14 to hold the subassembly in the opening 30. The wedge 22 thickness increases from an inserted end 34 that is inserted into the opening 30 to an opposite pinching end 38. As the subassembly is inserted into the opening 30, the pinching end 38 of the wedge 22 is forced toward the tone board 18, and pinches the reed 26 against the tone board 18.

The invention may also be embodied in game calls having different shapes that the one shown. For example, the hollow tubular body 14, bore, and opening 30 may have cross-sections that are not circular as illustrated. The bore and opening 30 may alternatively be a molded in a solid body. In this regard, the terms "hollow," "tubular," and "body," used in combination or alone, include any shape of body having a bore and opening of any shape extending therethrough.

The tone board 18 is characterized by a longitudinal axis 42. As used herein, "axially" and "axial" mean along the longitudinal axis 42 of the tone board 18. The tone board 18 includes an axial groove 46 and a plurality of tone board parallel ribs or teeth or ridges or projections 50 on opposite sides of the groove 46. The tone board projections 50 are separated from each other by tone board recesses 54.

The illustrated reed 26 is substantially cross shaped, having two axially-extending portions 58*a*, 58*b* and two lateral extensions 62. Alternatively, the reed 26 may be provided in other shapes, including a straight elongated shape that is not cross shaped. The illustrated reed 26 is shaped to accommodate the interlocking or interengaging structures of the wedge 22 and tone board 18 as discussed in more detail below. One of the axially-extending portions 58a extends between the sets of tone board projections 50, and is positioned over the groove 46. The reed 26 is thus shaped so that it does not overlay the tone board projections 50 and does not interfere with the operation of the tone board projections 50, as described below. The other axially-extending portion 58b extends axially away from the opening 30 beyond the pinching end 38 of the wedge 22 toward the distal end of the tone board 18 a distance 70 (FIG. 1). The distance 70 determines the frequency of vibration of the reed 26, and the resultant tone generated by the game call 10. A larger distance 70 will result in a lower tone.

The wedge 22 includes a cavity 74 and two sets of wedge parallel ribs or teeth or ridges or projections 78. The wedge projections 78 are separated by wedge recesses 82. The two sets of wedge projections 78 fit on either side of the axially extending portion 58a of the reed 26, and are inserted into selected tone board recesses 54 when the subassembly is assembled. The reed 26 thus extends between the two sets of wedge projections 50 and tone board projections 78 without interfering with the interengagement of the respective sets of projections 50, 78. The engagement between the projections 50, 78 of the wedge 22 and the tone board 18 resists relative axial movement between the wedge 22 and the tone board 18, such that when the subassembly is inserted into and removed from the opening 30, the wedge 22 will not slide axially with respect to the tone board 18. The projections 50, 78 and recesses 54, 82 facilitate easy and accurate positioning of the wedge 22 with respect to the tone board 18 and provide for systematic tuning of the game call 10.

Figure 3:
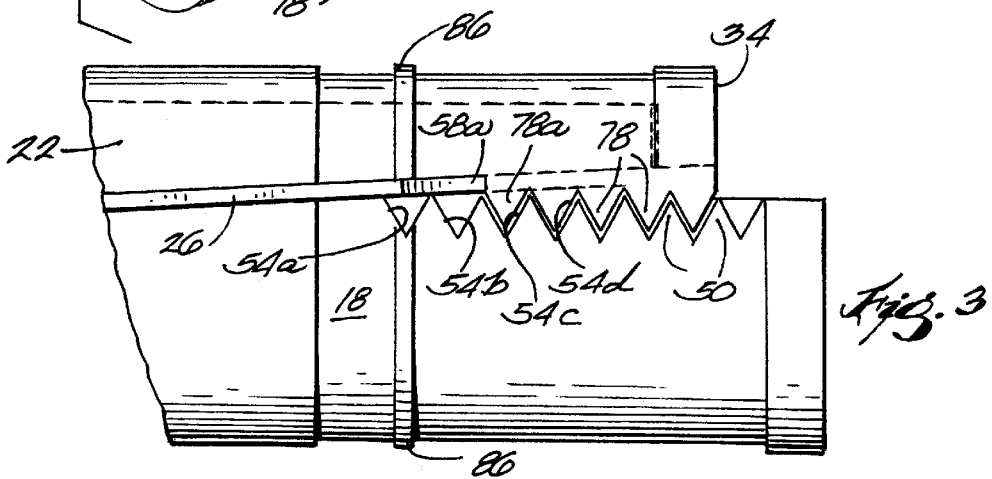
FIG. 3 is an enlarged view taken along line 3—3 in FIG. 2.

The wedge 22 and tone board 18 include quick reference setting marks 86 that are molded on the wedge 22 and tone board 18 and aligned by the manufacturer to provide a manufacturer's suggested tune. The game call 10 may be tuned by the operator by incrementally moving the wedge 22 with respect to the tone board 18 and reed 26. In this regard, the subassembly may be said to include an infinite tone system. Referring to FIG. 3, the tuning procedure will be described with reference to a first wedge projection 78a and first, second, third, and fourth tone board recesses 54a, 54b, 54c, 54d respectively. When the first wedge projection 78a extends into the first tone board recess 54a, the smallest distance 70 (FIG. 1) and the highest frequency and tone for a given reed 26 position are created. When the first wedge projection 78a extends into the fourth tone board recess 54d, the largest distance 70 and lowest frequency and tone for a given reed 26 position are created. The first wedge projection 78a is shown in FIG. 3 extending into the third tone board recess 54c.

The game call 10 is systematically tuned by first holding the reed 26 in a desired position with respect to the tone board 18. This may be accomplished, for example, by squeezing the reed 26 and tone board 18 together. Then the wedge 22 is positioned on the tone board 18 over the reed 26 such that the first wedge projection 78a extends into the first tone board recess 54a, and the axially-extending portion 58a of the reed 26 extends between the interengaging sets of projections 50, 78. This arrangement of the subassembly results in a relatively small distance 70 for a give reed 26 position.

The subassembly may then be inserted into the opening 30, and the engagement of the respective projections 50, 78 will resist axial movement between the wedge 22 and tone board 18. The engagement between the projections 50, 78, thus eliminates the need for the operator to prevent relative movement between the wedge 22 and tone board 18 upon insertion of the subassembly into the opening 30. This interengagement is believed to improve the accuracy with which the wedge 22 and tone board 18 may be positioned with respect to each other, and improve the stability of the subassembly as it is inserted into the opening 30.

The tone can be incrementally lowered by removing the subassembly from the opening 30, holding the reed 26 and tone board 18 together, moving the first wedge projection 78a into the second tone board recess 54b, and reinserting the subassembly into the opening 30. This will increase the distance 70 and lower the tone by an incremental amount for a given reed 26 position. It will be understood that the tone may be incrementally lowered by moving the first wedge projection 78a into the third and fourth tone board recesses 54c, 54d until the desired tone is reached. If the desired tone is not achieved, the reed 26 may be repositioned, and the process started over as described above.

If the operator desires to return to the manufacturer's suggested tune, the operator may align the quick reference setting marks 86. Also, the marks 86 provide a point of reference for all other settings. For example, an operator may prefer a setting that has the wedge mark 86 two settings away from the tone board mark 86 in one direction or another. The operator may quickly reset the tune of the game call 10 to that preferred setting if the subassembly is removed for any reason.

What is claimed is:

1. A game call comprising:

a body including a tubular portion having an opening;

an elongated tone board at least partially received within said opening, said tone board including a longitudinal axis and having a plurality of spaced apart tone board projections separated by tone board recesses;

a reed supported by said tone board; and a wedge securing said reed to said tone board and at least partially received within said opening, said wedge having a plurality of wedge projections complementary to said tone board recesses, said wedge positioned at a first axial position with respect to said tone board such that selected wedge projections extend into selected tone board recesses to resist relative axial movement between said wedge and said tone board;

wherein, when said wedge and tone board are removed from said opening, said wedge is movable with respect to the tone board to a second axial position in which said wedge projections extend into other selected tone board recesses to resist axial movement between said wedge and said tone board from said second axial position.

2. The game call of claim 1, wherein interengagement between said wedge projections and said tone board projections resists relative axial movement between said wedge and said tone board from said first axial position.

3. The game call of claim 1, wherein, when said wedge and tone board each include reference marks that are aligned to produce a manufacturer's suggested tune, and that may be used to facilitate tuning the game call.

* * * * *